(12) United States Patent
Jones et al.

(10) Patent No.: US 7,257,772 B1
(45) Date of Patent: Aug. 14, 2007

(54) REPRESENTING DOCUMENT OPTIONS, PROPERTIES AND BACKWARDS COMPATIBILITY SETTINGS USING A MARKUP LANGUAGE

(75) Inventors: Brian Jones, Redmond, WA (US); Robert Little, Redmond, WA (US); Martin Sawicki, Kirkland, WA (US); Andrew Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 10/730,301

(22) Filed: Dec. 8, 2003

Related U.S. Application Data

(63) Continuation-in-part of application No. 10/187,060, filed on Jun. 28, 2002.

(51) Int. Cl.
*G06F 17/00* (2006.01)
(52) U.S. Cl. ...................... 715/530; 715/513
(58) Field of Classification Search ................ 715/530, 715/513
See application file for complete search history.

(56) References Cited

OTHER PUBLICATIONS

Altova Inc. & Altova GmbH, "XML Spy 4.0 Manual," copyright 1998-2001, published Sep, 9, 2001, pp. 1-401.*
Alshuler, L., "Getting the Tags In: Vendors Grapple with XML-Authoring, Editing and Cleanup," The Seybold Report on Internet Publishing, vol. 5, No. 6, Feb. 2001, pp. 1-6.*
HV, Ltd., "WorX Standard Edition (SE) 'XML Authoring Made Easy'," HyperVision, Ltd., published on the Internet as of Jun. 3, 2001 as a PDF file linked to http://web.archive.org/web/20010603152210/www.hvltd.com/default.asp?name=information/xml/worxseOverview.xml&display=information/xsl/default.xsl, pp. 1-9.*
Mathias Neumuller and John N. Wilson; *Improving XML Processing Using Adapted Data Structures*; Oct. 7-10, 2002; pp. 206-220.
Surajit Chaudhuri and Kyuseok Shim; *Storage and Retrieval of XML Data using Relational Databases*; Advanced Technology Seminar 4; Abstract; Mar. 5, 2003; p. 802.
Mathias Neumuller and John N. Wilson; *Improving XML Processing Using Adapted Data Structures*, pp. 206-220.
Ullas Nambiar et al.; *Efficient XML Data Management: An Analysis*; EC-Web 2002, LNCS 2455; pp. 87-98.
Volkan Atalay and Erkan Arslan; *An SGML Based Viewer for Form Documents*; 1999 IEEE Jul. 1999; pp. 201-204.
Surajit Chaudhuri and Kyuseok Shim; *Storage and Retrieval of XML Data using Relational Databases*; Advanced Technology Seminar 4; Abstract; p. 802.
Xin Zhang et al.; *Clock: Synchronizing Internal Relational Storage with External XML Documents*; 2001 IEEE Jun. 2001; pp. 111-118.
Robert D. Cameron; *REX: XML shallow parsing with regular expressions*; Markup Languages: Theory & Practice 1.3, Summer 1999; pp. 61-88.
Danny Heijl; *The Delphi XML SAX2 Component & MSXML 3.10*; Dr. Dobb's Journal, Sep. 2001; pp. 42-54.
Chiyoung Seo et al.; *An efficient inverted index technique for XML documents using RDBMS*; Received Jan. 16, 2002; Information and Software Technology 45 (2003), Jun. 1, 2002; pp. 11-22.
Torsten Grabs et al.; *XMLTM: Efficient Transaction Management for XML Documents*; CIKM'02, Nov. 4-9, 2002; pp. 142-152.

* cited by examiner

*Primary Examiner*—William Bashore
*Assistant Examiner*—L. Ries
(74) *Attorney, Agent, or Firm*—Merchant & Gould P.C.

(57) ABSTRACT

The present invention is directed towards representing the native document settings of an application in a markup language such as XML. Applications that are capable of parsing the markup language are then able to parse the saved document settings and handle the document accordingly. Document settings saved in XML are human-readable, which simplifies maintenance of the document by humans.

26 Claims, 9 Drawing Sheets

US 7,257,772 B1

REPRESENTING DOCUMENT OPTIONS, PROPERTIES AND BACKWARDS COMPATIBILITY SETTINGS USING A MARKUP LANGUAGE

RELATED APPLICATIONS

This patent application is a continuation-in-part application under 35 United States Code § 120 of U.S. patent application Ser. No. 10/187,060 filed on Jun. 28, 2002, which is incorporated herein by reference. An exemplary schema in accordance with the present invention is disclosed in a file entitled Appendix.txt in a CDROM attached to an application entitled "Mixed Content Flexibility," Ser. No. 10/726,077, filed Dec. 2, 2003, which is hereby incorporated by reference in its entirety.

COMPUTER PROGRAM LISTING APPENDIX

A computer listing is included in a Compact Disc appendix in the attached CD ROM (quantity of two) in IBM-PC using MS-Windows operating system, containing file Appendix.txt, created on Nov. 2, 2006, containing 85,282 bytes (Copy 1 and Copy 2) and is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

Electronic documents are often edited by using various applications that are different from each other. For example, a document can be written by using a first application, and then saved in a native format of the first application. When a second application that is different from the first application reads the saved document, it must "understand" the native format of the first application in order for the saved document to be used by the second application. When (as in the present) the numbers of different applications increase, the authoring and maintenance of the multiple import schemes quickly becomes burdensome.

SUMMARY OF THE INVENTION

The present invention is directed towards representing the native document settings of an application in a markup language such as XML. Applications that are capable of parsing the markup language are then able to parse the saved document settings and handle the document accordingly. Document settings saved in XML are human-readable, which simplifies maintenance of the document by humans.

According to one aspect of the invention, a computer-readable medium having computer-executable components comprises three components. The first component is arranged to edit an electronic document comprising automatically generated document properties. The second component is arranged to prompt and receive custom properties for the electronic document from a user. The third component is arranged to encode in an ML format the electronic document, the automatically generated document properties, and the custom properties received from the user.

According to another aspect of the invention, a method for handling properties of electronic documents comprises editing an electronic document comprising automatically generated document properties. Custom properties for the electronic document are prompted and received from a user. The electronic document, the automatically generated document properties, and the custom properties received from the user are encoded in an ML format.

According to yet another aspect of the invention, a system for displaying and modifying electronic documents comprises an electronic document file, an editor, and an encoder. The electronic document file comprises automatically generated document properties. The editor is arranged to prompt and receive custom properties for the document from a user. The encoder is arranged to encode in an ML format the electronic document, the automatically generated document properties, and the custom properties received from the user.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's structural function (e.g., heading, paragraph, etc.) The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
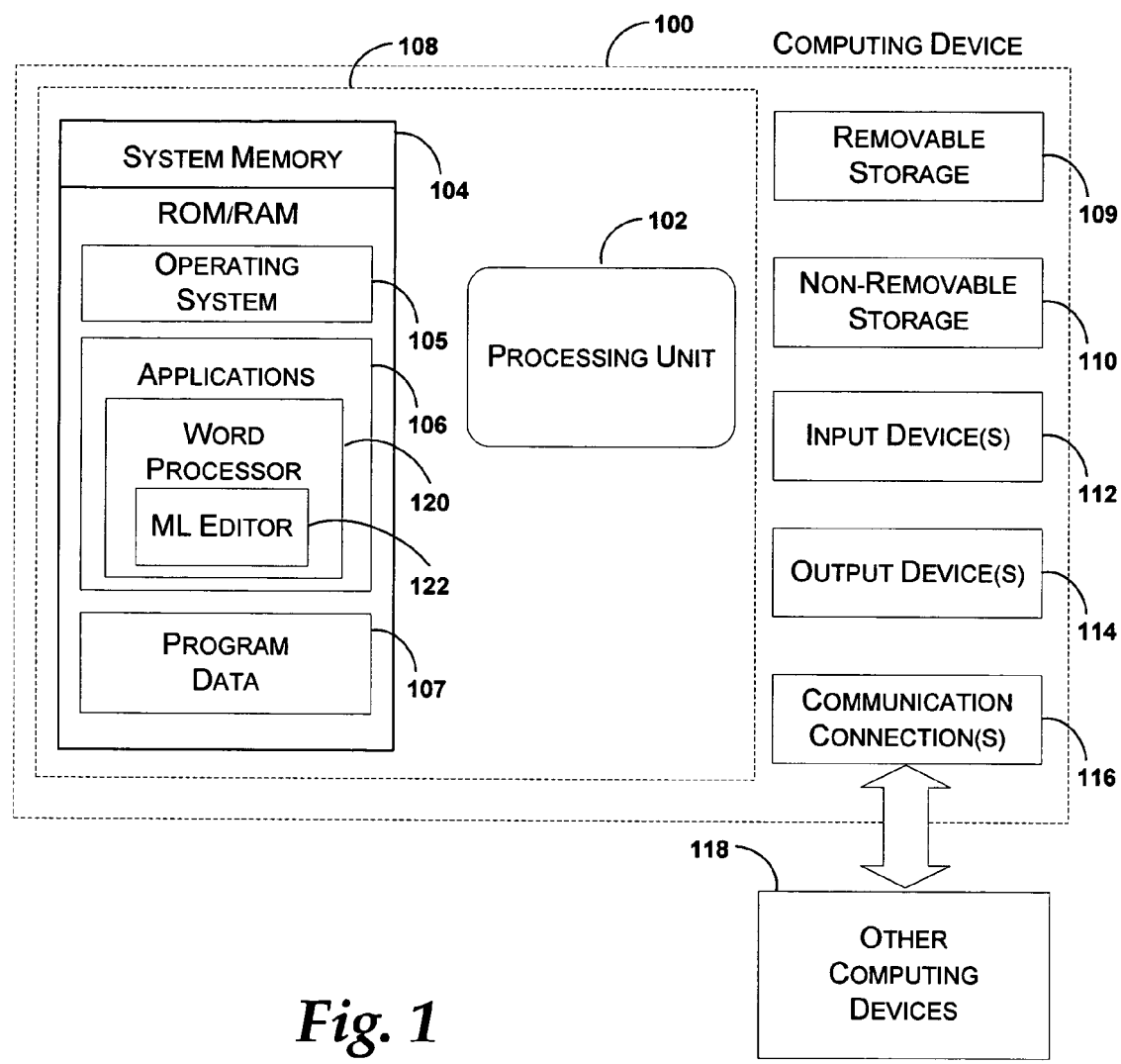
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes ML editor 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Word-Processor File Structure

Figure 2:
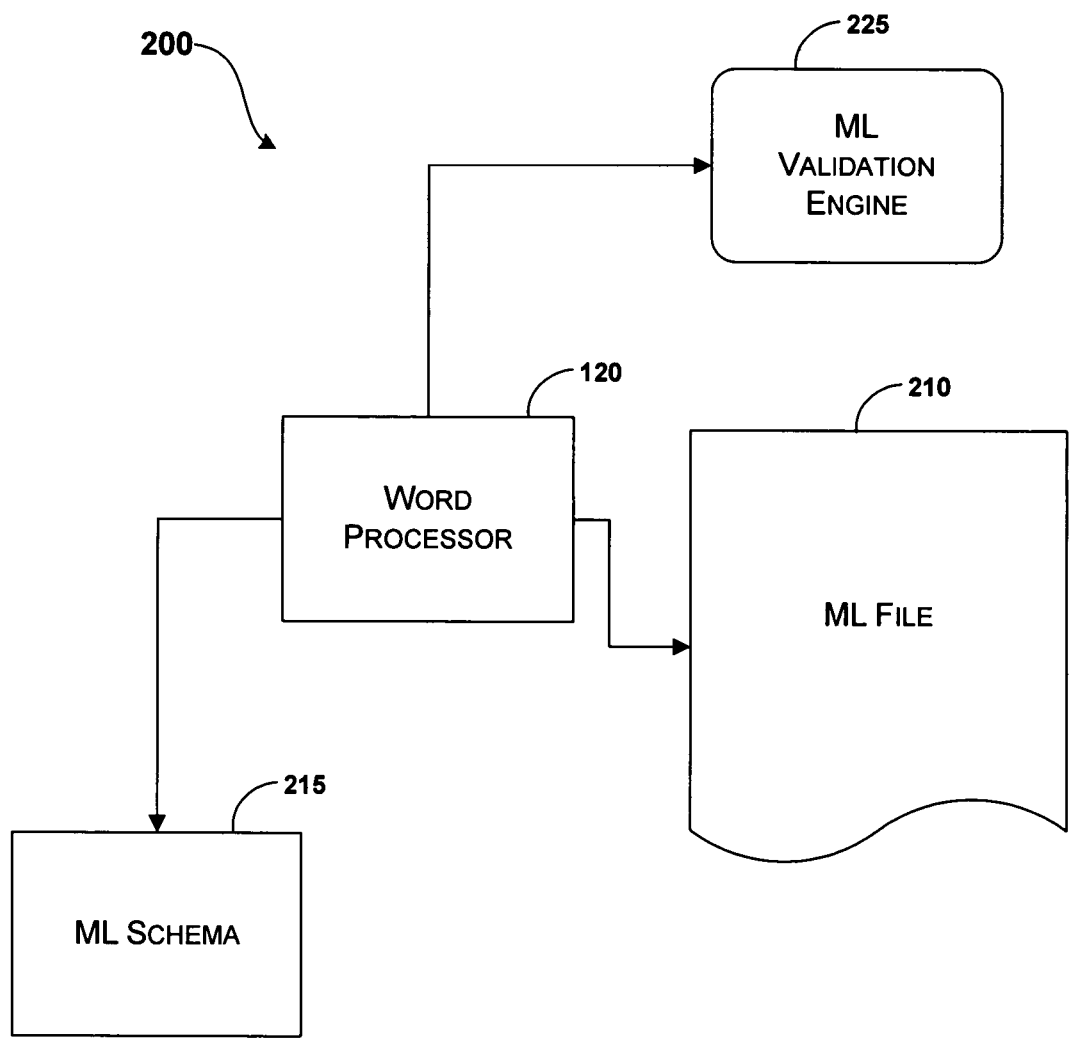
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML.

Word-processor 120 internally validates ML file 210. When validated, the ML elements are examined as to whether they conform to the ML schema 215. As previously described above, a schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Figure 3:
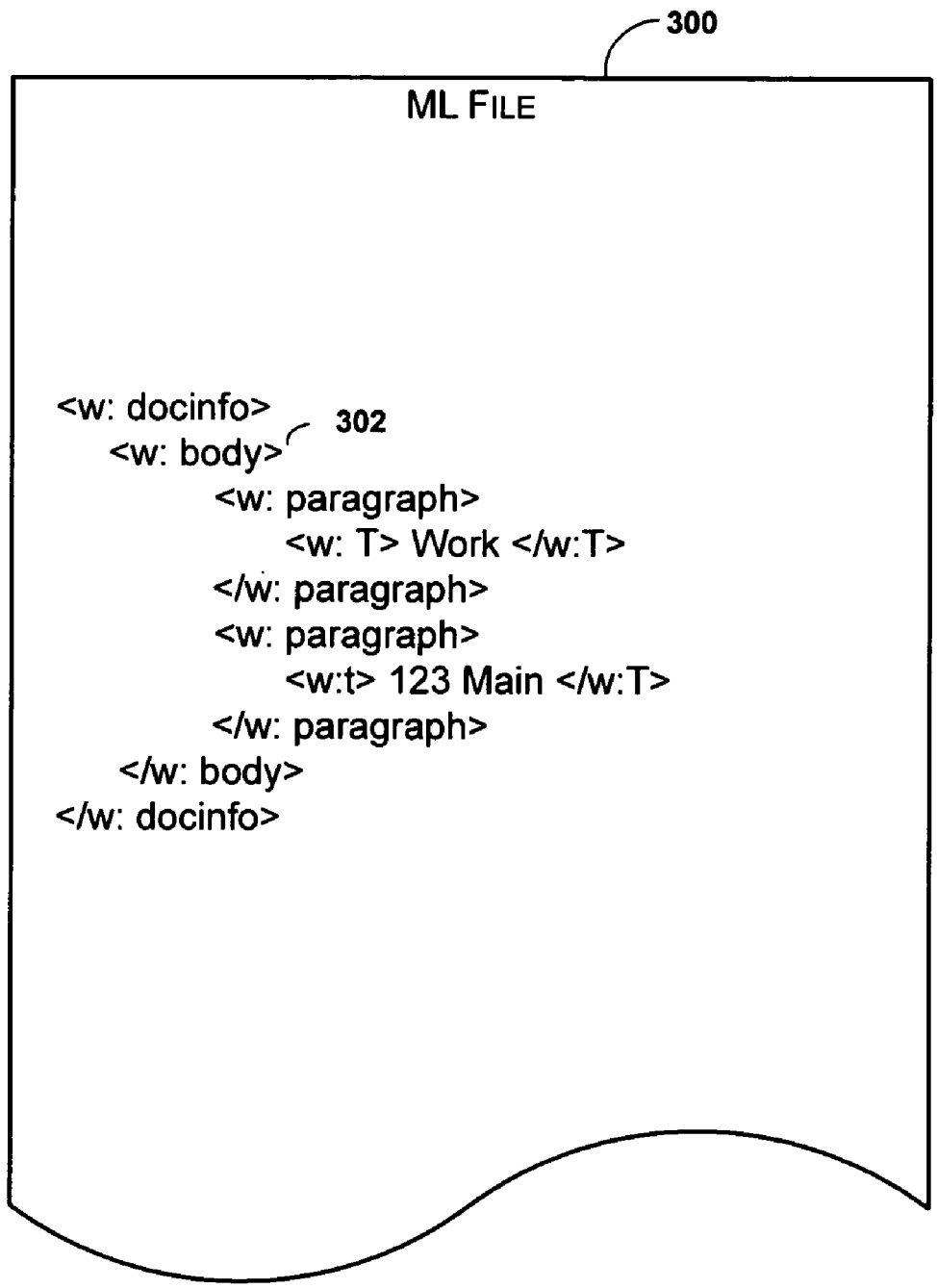
FIG. 3 illustrates an exemplary ML file in accordance with aspects of the present invention.

FIG. 3 illustrates an exemplary ML file in accordance with aspects of the present invention. ML file 300 includes ML elements. An element in a markup language usually includes an opening tag (indicated by a "<" and ">"), some content, and a closing tag (indicated by a "</" and ">"). In this example, tags associated with ML include a "w:" within the tag (e.g., 302). The "w:" prefix is used as shorthand notation for the namespace associated with the element.

The text contained within the document follows the "T" tag, making it relatively easy for an application to extract the text content from a word-processing document created in accordance with aspects of the invention. Given that the example shown is valid, ML file 210 produces a document with a body and two paragraphs that include the text "Work" in the first paragraph and "123 Main" in the second paragraph.

The text contained within the document can be displayed according to styles that can be declared in the ML file. Typically, the styles declarations are declared near the top of the ML file, which allows the styles to be referenced by various objects in the body of the document. For example, a root element "w:wordDocument" can be used to declare the child element "w:styles," which can be used to store the style definitions.

Many applications used to edit objects within a document are capable of maintaining certain pieces of information about a document. Some of the pieces are automatically generated by the application and some are created by the users. Those pieces of information are not usually considered part of the document (they are not typically visible in the document body and there is special user interface to control them), but rather are options that help the application manage the document. In accordance with the present invention, the document property settings are represented in an ML file (such as XML, throughout).

Applications (such as word-processors that are rich in features) typically categorize the document properties. The document properties can be categorized as automatically generated properties, custom/user-defined properties, and compatibility settings. Another category may include other settings that are set implicitly by the user when editing the document, such as "view" settings, validation, proofing, and the like.

Typically, these properties are written out in the ML file format inside their own special container elements. The container elements in ML can include "DocumentProperties," "CustomDocumentProperties," "compat," and "docPr."

Certain property settings of the document can be generated automatically by the application and saved as ML elements. The following property settings can be saved inside the "DocumentProperties" element container:

LastAuthor—represents the last author of the document,
Revision—represents the revision number of the document,
TotalTime—total time spent editing the document,
Created—the date/time the document was first created,
LastSaved—the date/time the document was last saved,
Pages—number of pages in the document,
Words—number of words in the document,
Characters—number of characters in the document,
Lines—number of lines of text in the document,
Paragraphs—number of paragraphs in the document,
CharactersWithSpaces—number of characters and spaces in the document,
Version—version number of the application that last saved this document.

Figure 4:
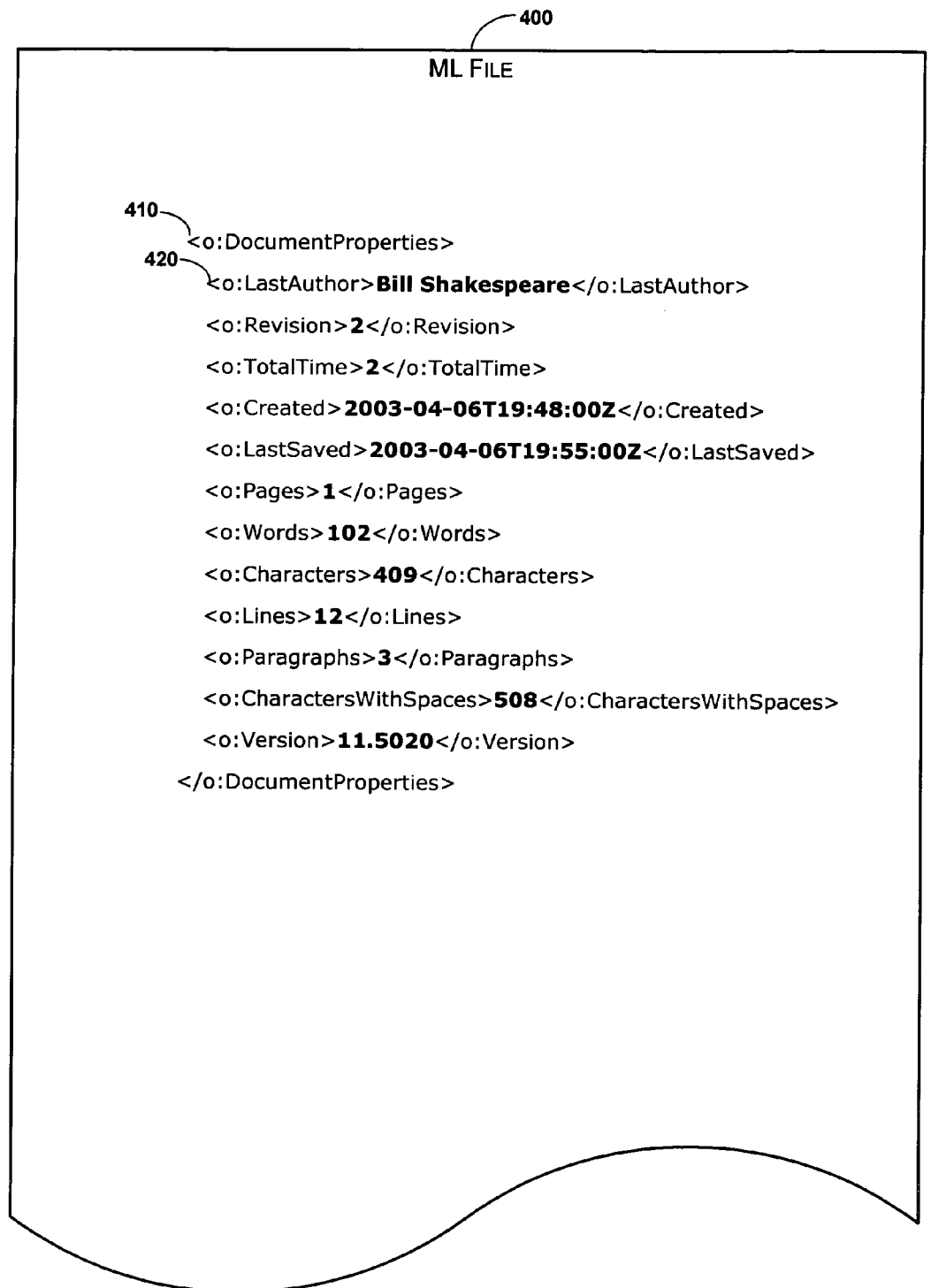
FIG. 4 illustrates an exemplary document properties element, in accordance with aspects of the present invention.

FIG. 4 illustrates an exemplary document properties element, in accordance with aspects of the present invention. The figure illustrates listing 400 having a document properties element (410). Document properties element 410 is a "container" element, which includes document property settings that can be generated automatically. Property settings elements 420 include elements such as "LastAuthor," "Revision," "TotalTime," and the like.

In addition to document property settings that can be generated automatically, elements that are used to represent properties defined entirely by the user can be generated based on the name of the property. The user can select the name of the property, its data type (string vs. numeric vs. other) and the value. These properties can be accessed through a special "Properties" user interface in the application.

The name of the property can be converted into an element name through a process of character encoding. It is often necessary to encode the name because certain characters are not allowed to appear in element names. For example, if the user chooses a property name that contains a space, the space can be converted into a sequence of characters that is valid in an element name and that is used to represent the space character specifically (e.g., _x0020_. An appropriate encoding for such disallowed characters can be selected for each different application.

The data type of the custom property can be represented by the "dt" attribute setting, which can have values such as:
"string"—to represent alpha-numeric strings and dates
"float"—to represent numbers
"boolean"—to represent Yes-or-No settings Each of these properties can be saved as elements inside the "CustomDocumentProperties" container element. The value of the property the element represents can be stored as the content of each element. For example, the following figure is used to represent four different user-defined document properties.

Figure 5:
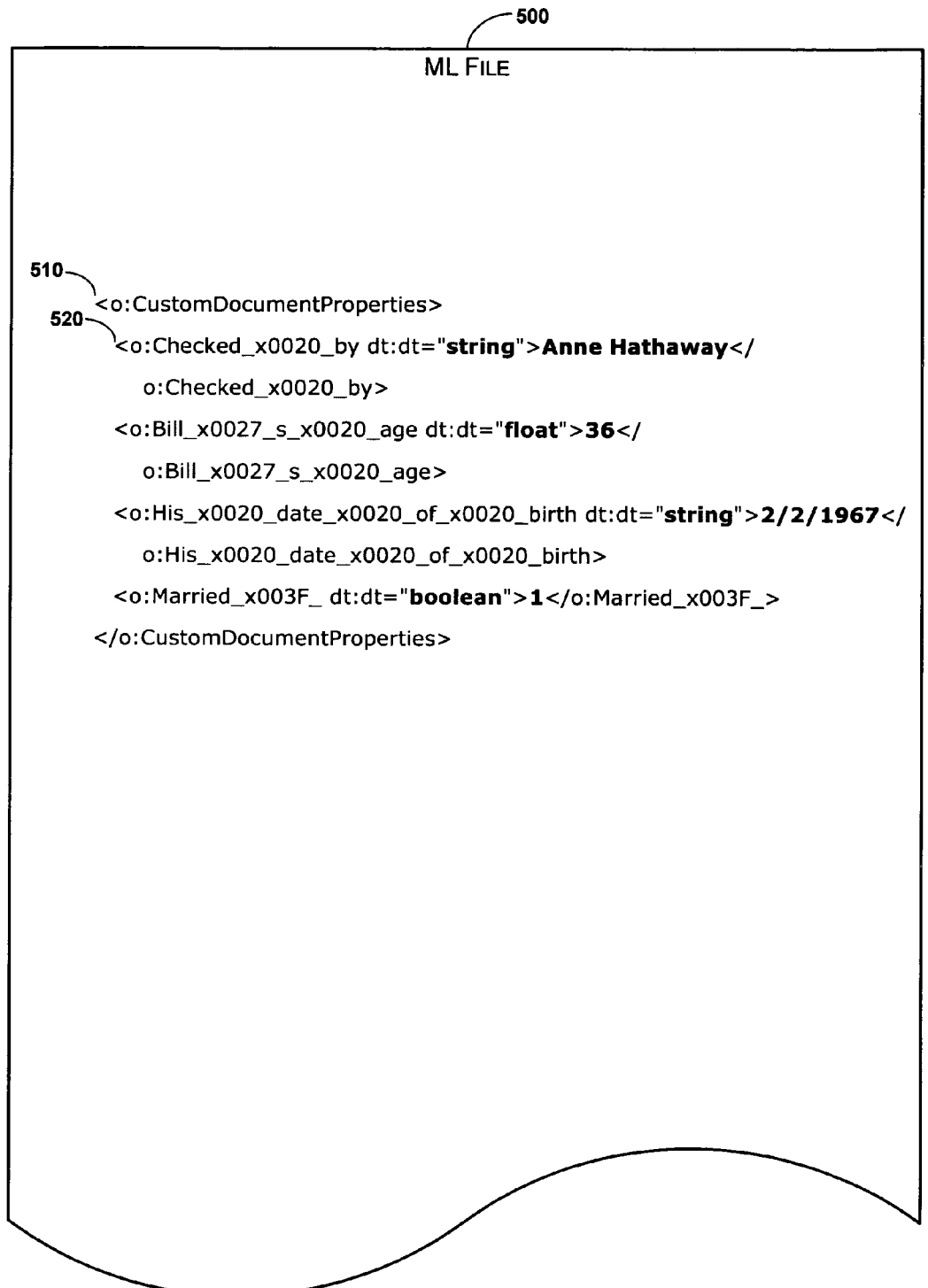
FIG. 5 illustrates an exemplary custom document properties element, in accordance with aspects of the present invention.

FIG. 5 illustrates an exemplary custom document properties element, in accordance with aspects of the present invention. The figure illustrates listing 500 having a custom document properties element (510). Custom document properties element 510 is a container element, which includes custom document property settings that can be user-defined. Custom property settings elements 520 include elements such as "Checked by," "Bill's age," "His date of birth," and "Married."

Furthermore, ML elements can also be used to represent special backwards compatibility settings supported by an application. The presence of such special backwards compatibility settings in the document can be used to change the application's selected behaviors to match the special backwards compatibility settings of earlier versions of the application. The special backwards compatibility settings can be generally changed by the user in an application's special compatibility dialog. The special backwards compatibility settings can also be set by the application automatically such as when the application opens a document saved by an earlier version or another application.

Typically, the special backwards compatibility settings are Boolean in nature, meaning that they are either "on" or "off." Each Boolean setting can be saved as a separate empty element whose name identifies the option. There are typically no attributes on the special backwards compatibility settings elements. The mere presence of the element indicates that the corresponding option defaults to "on." The absence of an element indicates the option is "off." (Alternatively, the mere presence of a Boolean setting could have a default of "off.") The ML elements used to represent these backwards compatibility settings can be saved inside of the "compat" element container.

Figure 6:
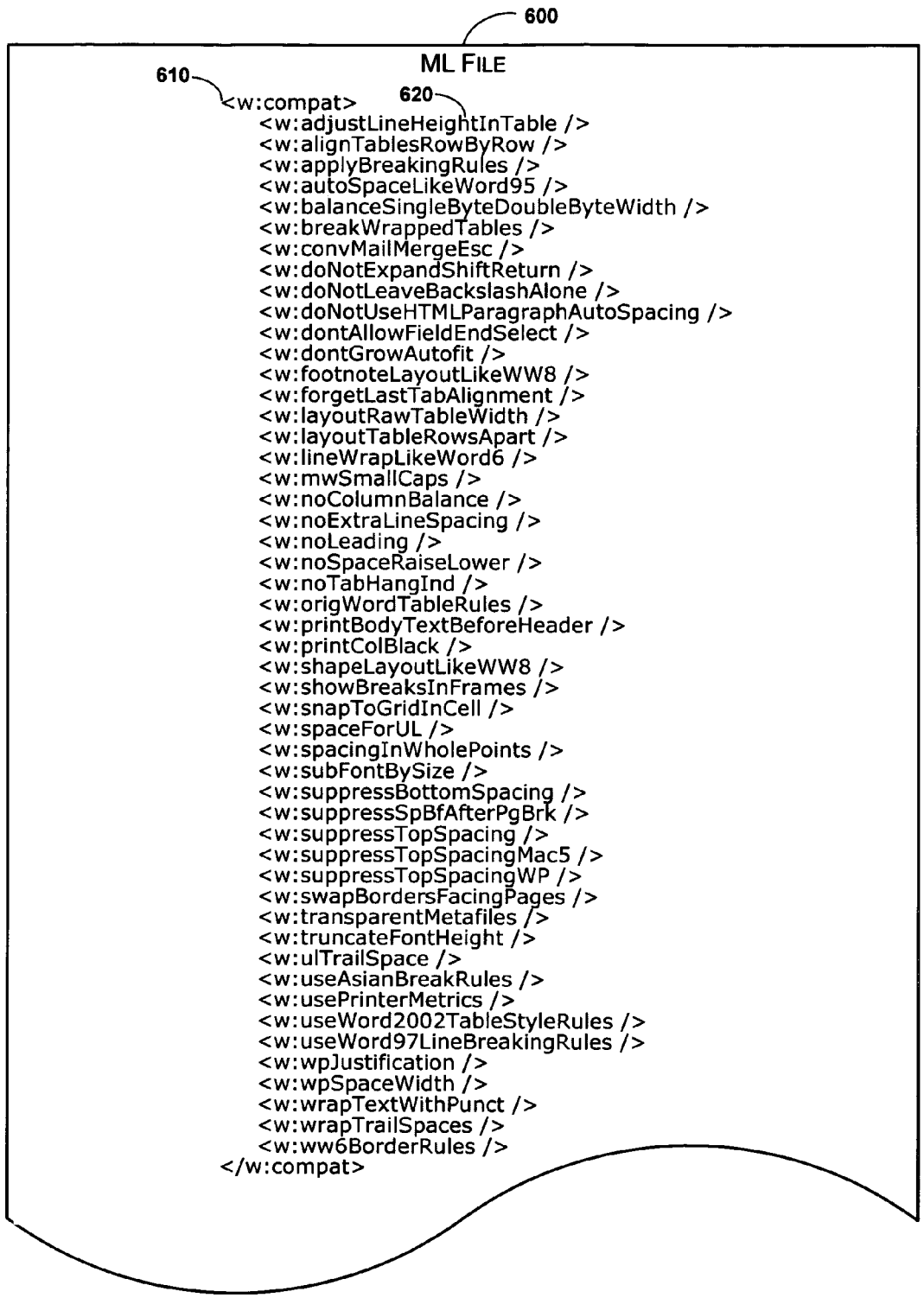
FIG. 6 illustrates an exemplary compatibility element, in accordance with aspects of the present invention.

FIG. 6 illustrates an exemplary compatibility element, in accordance with aspects of the present invention. The figure illustrates listing 600 having a compatibility element (610). Compatibility element 610 is a container element, which includes child elements that may include compatibility settings for selected behaviors. Compatibility child elements 620 include elements such as "adjustLineHeightInTable," "alignTablesRowByRow," "applyBreakingRules," and the like.

Additionally, ML elements can also be used to represent implicit user setting and preferences. The implicit user setting and preferences can be used to preserve the different document option settings and preferences set by the user in editing the document. The implicit user setting and preferences are generally intended to restore the application environment to the same state in terms of user interface behavior (and other aspects) when the document is reopened. For example, the restored application environment may include the view in which the document was last edited, whether XML validation was enabled, and the like.

Some of the implicit user setting and preferences properties can be saved inside the "docPr" element (discussed with reference to FIG. 8, below) and others of the implicit user setting and preferences can be saved inside the DocumentProperties element. The values of the children of DocumentProperties can be arbitrary strings that are entirely user-defined.

Figure 7:
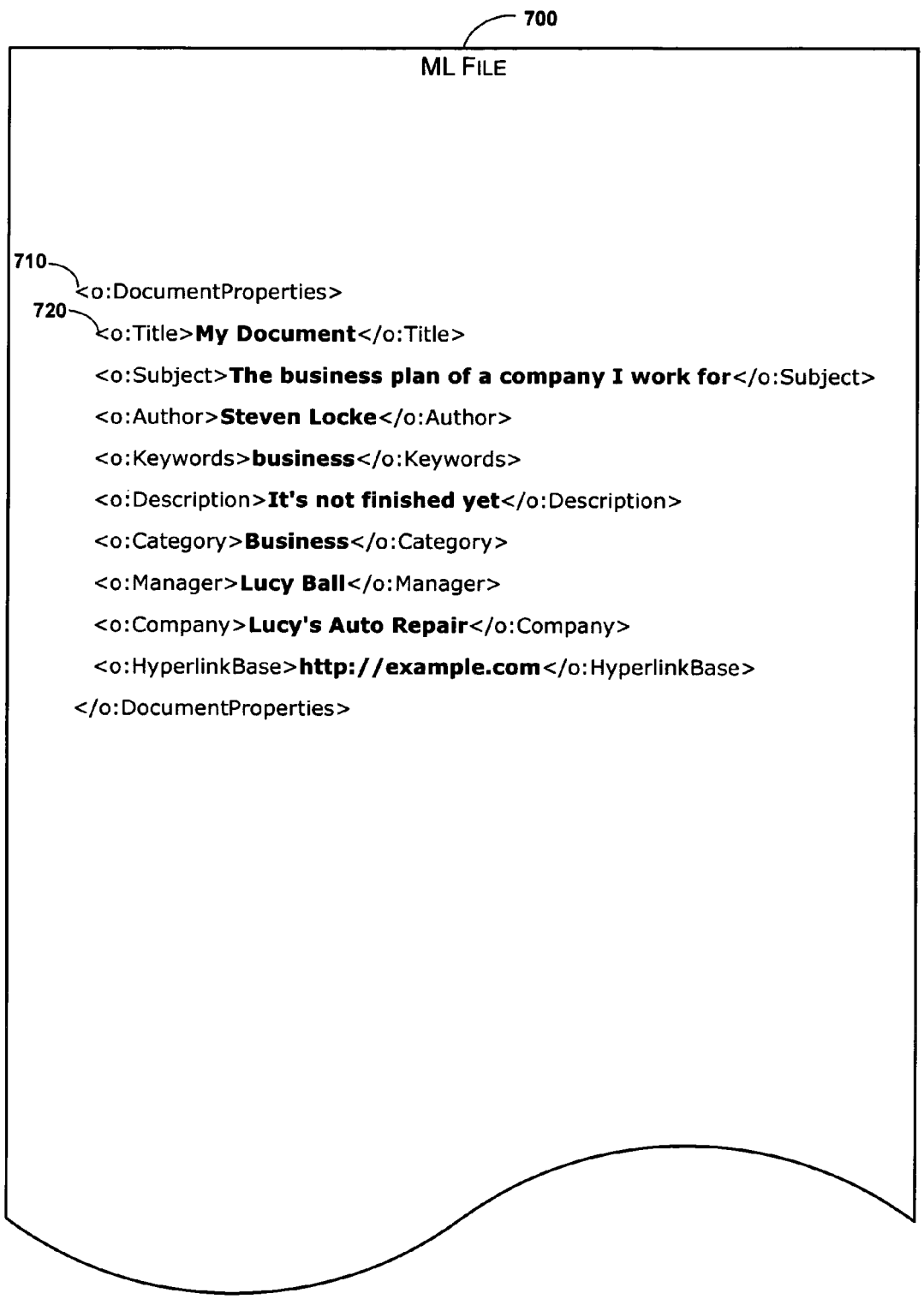
FIG. 7 illustrates an exemplary document properties element having user-defined arbitrary strings, in accordance with aspects of the present invention.

FIG. 7 illustrates an exemplary document properties element having user-defined arbitrary strings, in accordance with aspects of the present invention. The figure illustrates listing 700 having a document properties element (710). Document properties element 710 is a container element, which may include arbitrary strings that can be user-defined. Document child elements 720 include elements such as "Title," "Subject," "Author," and the like. The contents of the element typically include user-defined arbitrary strings such as "My Document," "The business plan of a company I work for," and the like.

The "docPr" element is a container element in which the children elements can be used by the application to preserve the states of the different application behaviors activated or deactivated by a user. The states of the different application behaviors are available to the user in various parts of the application user interface (e.g., such as the "Options" dialog, and the like). The states of the different application behaviors are represented by elements. Some of the children elements are arranged to accept special attributes as well as accepting other elements as children. Table 1 lists and describes various application behaviors that are represented by various elements.

TABLE 1

| | |
|---|---|
| view | represents the view in which the document was last edited. Its "val" attribute can be used to specify the view. |
| zoom | specifies the zoom in which the document was last edited. Its attributes contain the actual zoom setting. |
| doNotEmbedSystemFonts | determines whether font descriptions are embedded in the file even if they are typically present on the system. |
| attachedTemplate | a pointer to the template file the document is based on. |
| documentProtection | represents various aspects of the document protection state. |
| defaultTabStop | determines the positions of the default tab stop. |
| characterSpacingControl | specifies different settings for the algorithm that lays out characters when the document is displayed in the application or printed. |
| optimizeForBrowser | used to determine for which browser the document, when saved as HTML, is supposed to be optimized. |
| validateAgainstSchema | determines whether the document should be validated against the attached XML schema (if any). |
| saveInvalidXML | determines whether the app should allow the user to save the document as XML if it does not adhere to the attached customer-defined schema. |
| ignoreMixedContent | represents the option to ignore mixed XML content for validation purposes and when saving to customer-defined schema only. |
| alwaysShowPlaceholderText | determines whether placeholder text is automatically generated and shown by the app for each empty customer-defined XML element. |
| doNotUnderlineInvalidXML | controls the underlines' appearance near customer-defined schema violations. |
| footnotePr | complex element (with additional children) used to represent default properties of a footnote. |
| endnotePr | complex element (with additional children) used to represent default properties of an endnote. |

Figure 8:
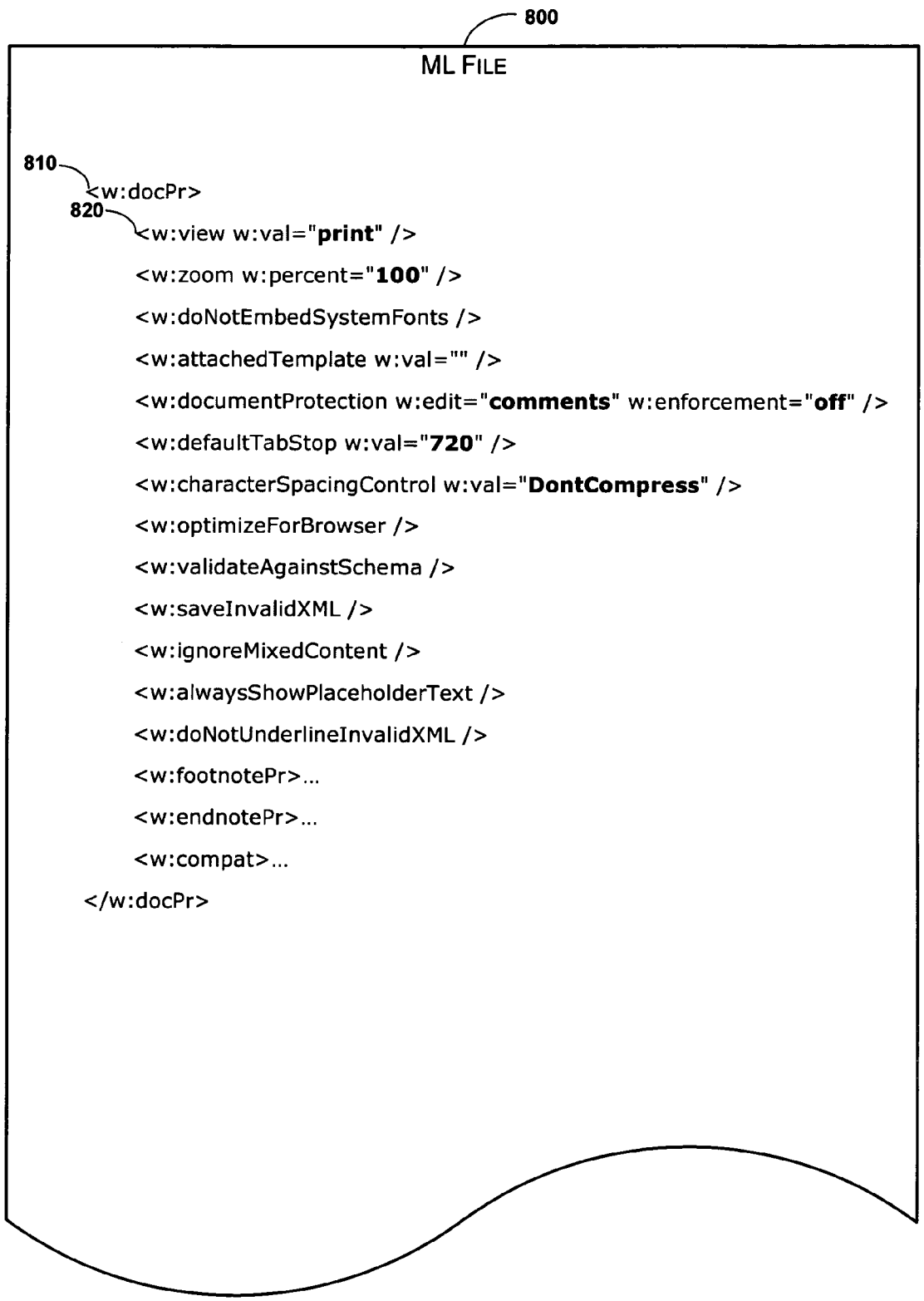
FIG. 8 illustrates an exemplary document preservation element, in accordance with aspects of the present invention.

FIG. 8 illustrates an exemplary document preservation ("docPr") element, in accordance with aspects of the present invention. The figure illustrates listing 800 having a document preserve (810). Document preserve element 810 is a container element, which includes child elements that may include child elements that store settings for selected behaviors. Document preserve elements 820 include elements such as "view," "zoom," "doNotEmbedSystemFonts," and the like. Each of the disclosed elements and attributes can be mapped to an internal word processor structure that (if present) represents a corresponding feature in the application.

Figure 9:
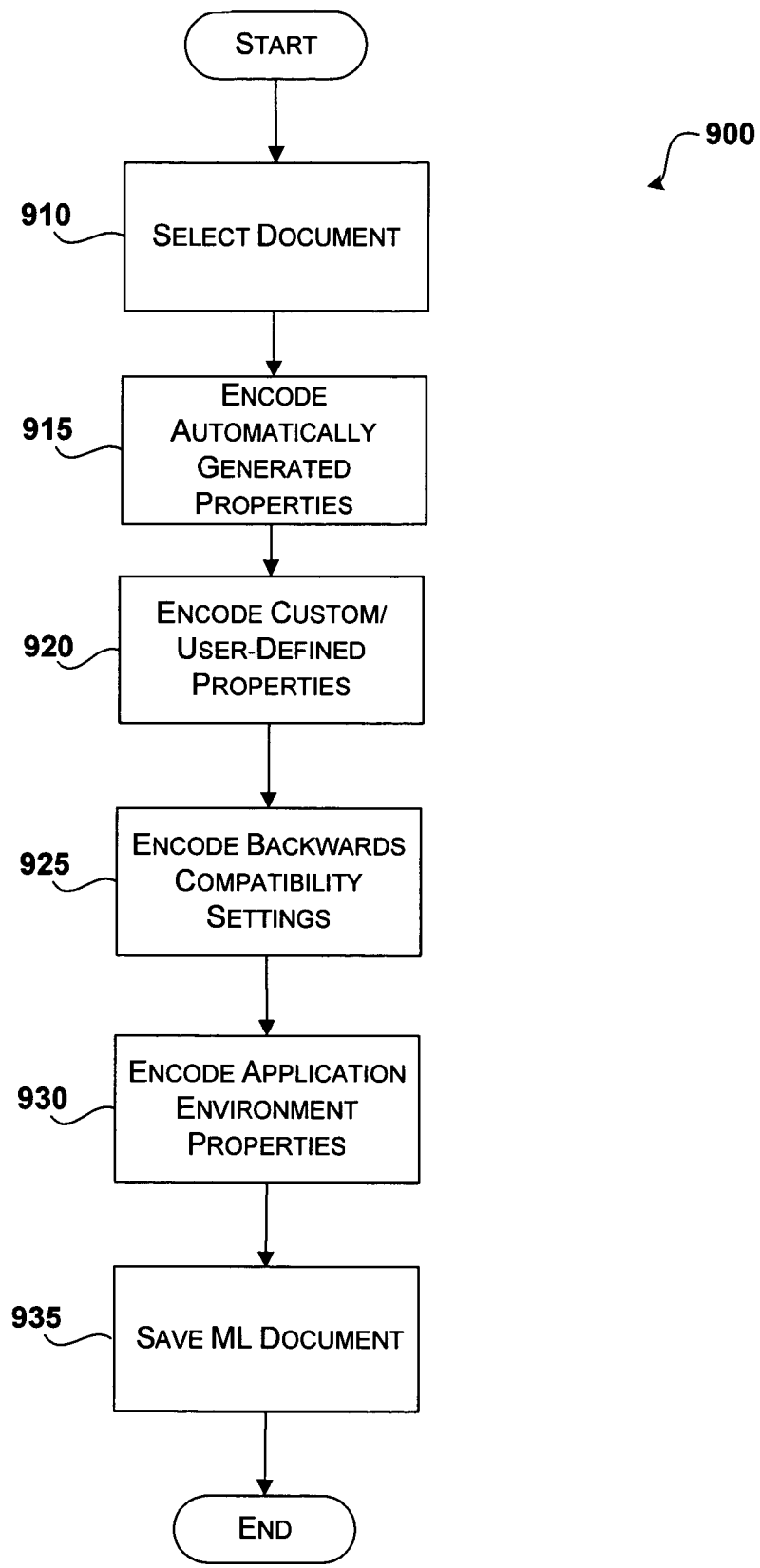
FIG. 9 illustrates of a process flow for representing document options, properties and backwards compatibility settings using XML, in accordance with aspects of the invention.

FIG. 9 illustrates of a process 900 flow for representing document options, properties and backwards compatibility settings using XML, in accordance with aspects of the invention. After a start block, the process moves to block 910, at which point a document is opened for editing by a user. The selection of the file for opening may, for example, include highlighting the selected file within a file browser. The document may be, for example, a document that includes spreadsheet cells or word-processor paragraphs. The document may be stored in a proprietary format of the application process.

At block 915, the process encodes in an ML format the automatically generated properties of the electronic document. The automatically generated properties can be saved inside the "DocumentProperties" element container. The application process typically provides a dialog that allows the user to specify the properties.

Continuing at block 920, the process typically provides a dialog that allows the user to specify the custom/user-defined properties. The custom/user-defined properties can be saved as ML elements inside the "CustomDocumentProperties" container element.

At block 925, the process encodes in an ML format the backwards compatibility settings supported by an application. The ML elements used to represent these backwards compatibility settings can be saved inside of the "compat" element container Flowing to block 930, the process encodes in an ML format the application environment properties of the opened electronic document. The "docpr" element is a container element in which the children elements can be used by the application to preserve the states of the different application behaviors activated or deactivated by a user.

At block 935, the document is saved using an ML format. Saving the "native" properties of the process in an external ML file permits other editing applications to preserve the saved properties without having to understand the native file format of an arbitrary editing program.

As a further illustration of representing the native document settings of an application in a markup language, a schema is provided as follows:

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer storage medium having computer-executable components, comprising:
   a first component that is arranged to edit an electronic document comprising automatically generated document properties;
   a second component that is arranged to prompt and receive custom properties for the electronic document from a user; and
   a third component that is arranged to encode in a markup language (ML) format the electronic document, the automatically generated document properties, backwards compatibility properties, and the custom properties received from the user.

2. The computer-readable medium of claim 1, wherein the electronic document is a word-processor document.

3. The computer-readable medium of claim 1, wherein the electronic document is a spreadsheet document.

4. The computer-readable medium of claim 1, further comprising a fourth component that is arranged to generate the backwards compatibility properties in response to a version number of the computer-executable component.

5. The computer-readable medium of claim 4, further comprising a fourth component that is arranged to generate application environment properties in response to an application environment of the computer-executable components, and wherein the third component is further arranged to encode the application environment properties in an ML format.

6. The computer-readable medium of claim 5, wherein the application environment properties comprise a zoom element.

7. The computer-readable medium of claim 4, wherein the backwards compatibility properties comprise a Justification element.

8. The computer-readable medium of claim 1, wherein the automatically generated document properties comprise a LastAuthor element.

9. The computer-readable medium of claim 1, wherein the custom properties comprise a Married element of type Boolean.

10. A method for handling electronic documents, comprising:
    editing an electronic document comprising automatically generated document properties;
    prompting and receiving custom properties for the electronic document from a user;
    generating backwards compatibility properties in response to a version number of the computer-executable component, and encoding the backwards compatibility properties in an ML format; and
    encoding in a markup language (ML) format the electronic document, the automatically generated document properties, and the custom properties received from the user.

11. The method of claim 10, wherein the electronic document is a word-processor document.

12. The method of claim 10, wherein the electronic document is a spreadsheet document.

13. The method of claim 10, further comprising generating application environment properties in response to an application environment of the computer-executable components, and wherein the third component is further arranged to encode the application environment properties in an ML format.

14. The method of claim 13, wherein the application environment properties comprise a zoom element.

15. The method of claim 10, wherein the automatically generated document properties comprise a LastAuthor element.

16. The method of claim 10, wherein the custom properties comprise a Married element of type Boolean.

17. The method of claim 10, wherein the backwards compatibility properties comprise a Justification element.

18. A computer system for displaying and modifying electronic documents, comprising:
    an electronic document file that comprises automatically generated document properties;
    an editor that is arranged to prompt and receive custom properties for the electronic document from a user and to generate backwards compatibility properties in response to a version number of the computer-executable component, and wherein the editor is further arranged to encode the backwards compatibility properties in an ML format; and
    an encoder that is arranged to encode in a markup language (ML) format the electronic document, the automatically generated document properties, and the custom properties received from the user.

19. The system of claim 18, wherein the electronic document is stored in a proprietary format.

20. The system of claim 18, wherein the electronic document is a word-processor document.

21. The system of claim 18, wherein the electronic document is a spreadsheet document.

22. The system of claim 18, wherein the editor is further arranged to generate application environment properties in response to an application environment of the computer-executable components, and wherein the third component is further arranged to encode the application environment properties in an ML format.

23. The system of claim 22, wherein the application environment properties comprise a zoom element.

24. The system of claim 18, wherein the automatically generated document properties comprise a LastAuthor element.

25. The system of claim 18, wherein the wherein the custom properties comprise a Married element of type Boolean.

26. The system of claim 18, wherein the backwards compatibility properties comprise a Justification element.

* * * * *